(12) United States Patent
Parry et al.

(10) Patent No.: US 7,464,023 B2
(45) Date of Patent: Dec. 9, 2008

(54) LINGUISTIC ANALYSIS SYSTEM

(76) Inventors: Glyn Parry, April Cottage, 14 The Parkway, Rustington, West Sussex, BN16 2BU (GB); James Brackin, 154 Goring Road, Worthing, West Sussex, BN12 4PH (GB)

(*) Notice: Subject to any disclaimer, the term of this patent is extended or adjusted under 35 U.S.C. 154(b) by 868 days.

(21) Appl. No.: 10/784,630

(22) Filed: Feb. 23, 2004

(65) Prior Publication Data

US 2004/0249630 A1    Dec. 9, 2004

(30) Foreign Application Priority Data

Jun. 5, 2003    (GB) .................................. 0312954.1

(51) Int. Cl.
G06F 17/27    (2006.01)
G06Q 90/00    (2006.01)

(52) U.S. Cl. ......................................... 704/9; 705/500

(58) Field of Classification Search .................. None
See application file for complete search history.

(56) References Cited

U.S. PATENT DOCUMENTS

| 4,930,077 A * | 5/1990 | Fan ................................. 704/8 |
| 5,781,879 A * | 7/1998 | Arnold et al. ................... 704/9 |
| 5,794,177 A * | 8/1998 | Carus et al. ..................... 704/9 |
| 6,418,435 B1 * | 7/2002 | Chase ............................ 707/5 |
| 7,136,877 B2 * | 11/2006 | Volcani et al. .............. 707/200 |
| 7,137,070 B2 * | 11/2006 | Brown et al. ................. 715/744 |

* cited by examiner

Primary Examiner—David R Hudspeth
Assistant Examiner—Brian L Albertalli
(74) Attorney, Agent, or Firm—Lucas & Mercanti, LLP

(57) ABSTRACT

A computer provided with a word processing program comprising a syntax evaluation and amendment means adapted to identify predetermined syntax arrangements in inputted text, and to provide alternative syntax arrangements for the inputted text, characterised in that the inputted text is intended to advertise, promote or market goods or services, and the alternative syntax arrangements are adapted to enhance the capability of the inputted text to promote said goods or services.

11 Claims, 4 Drawing Sheets

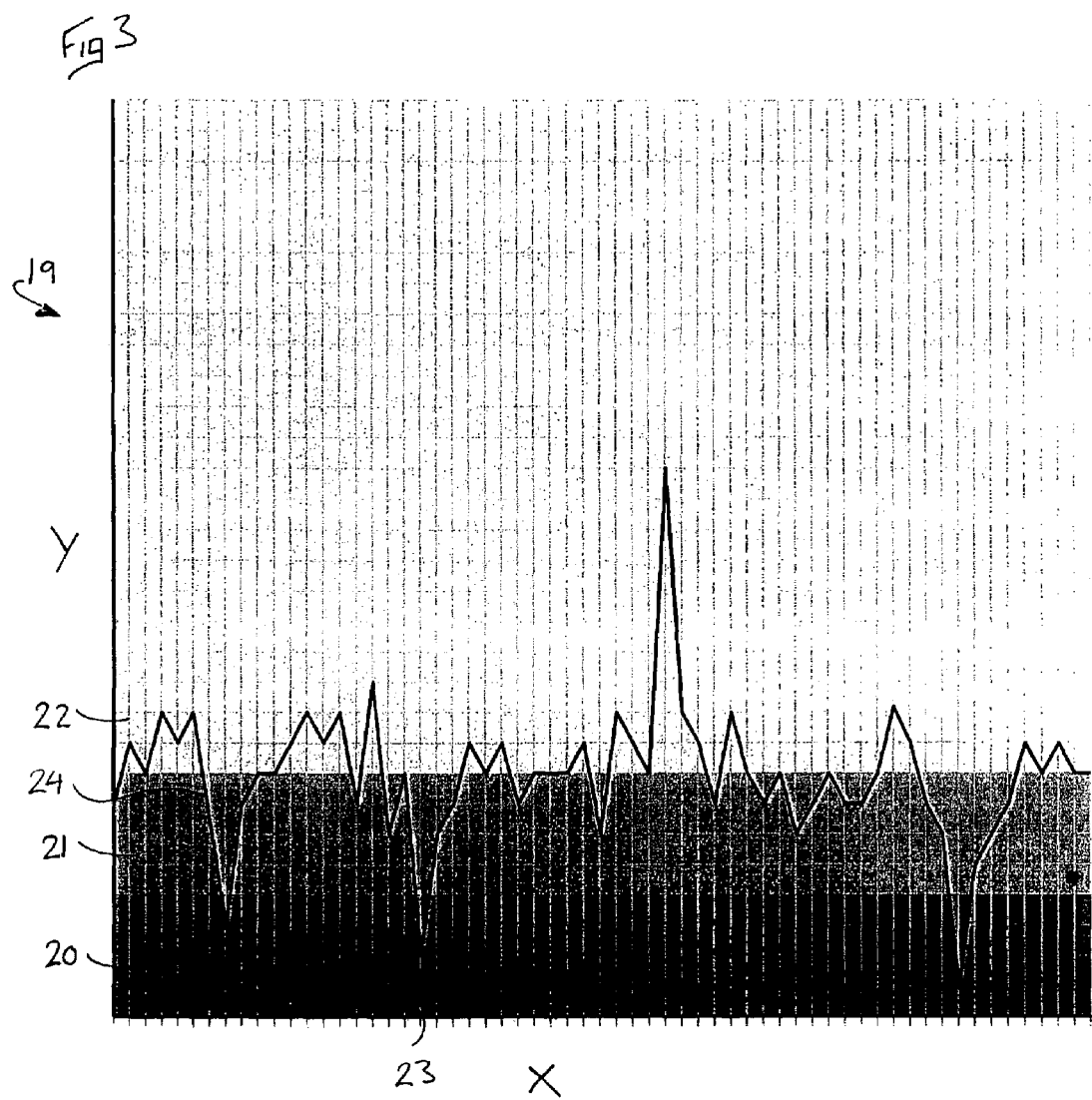

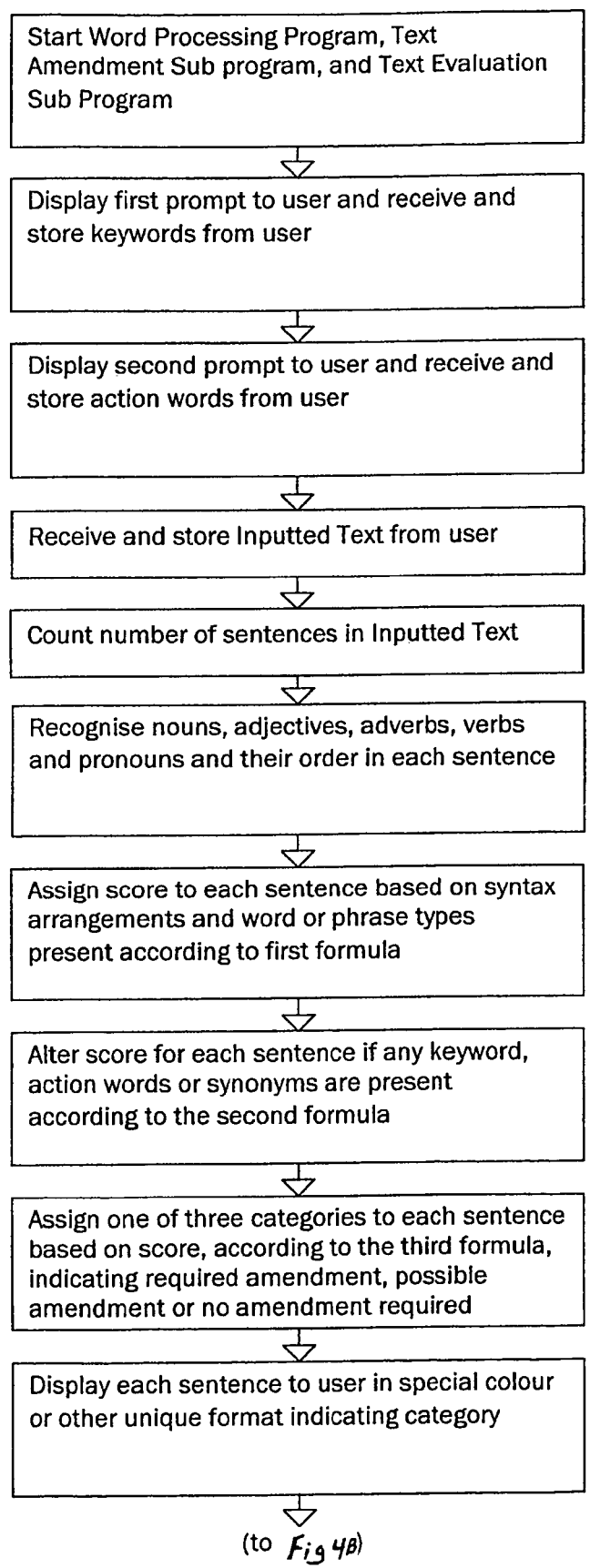

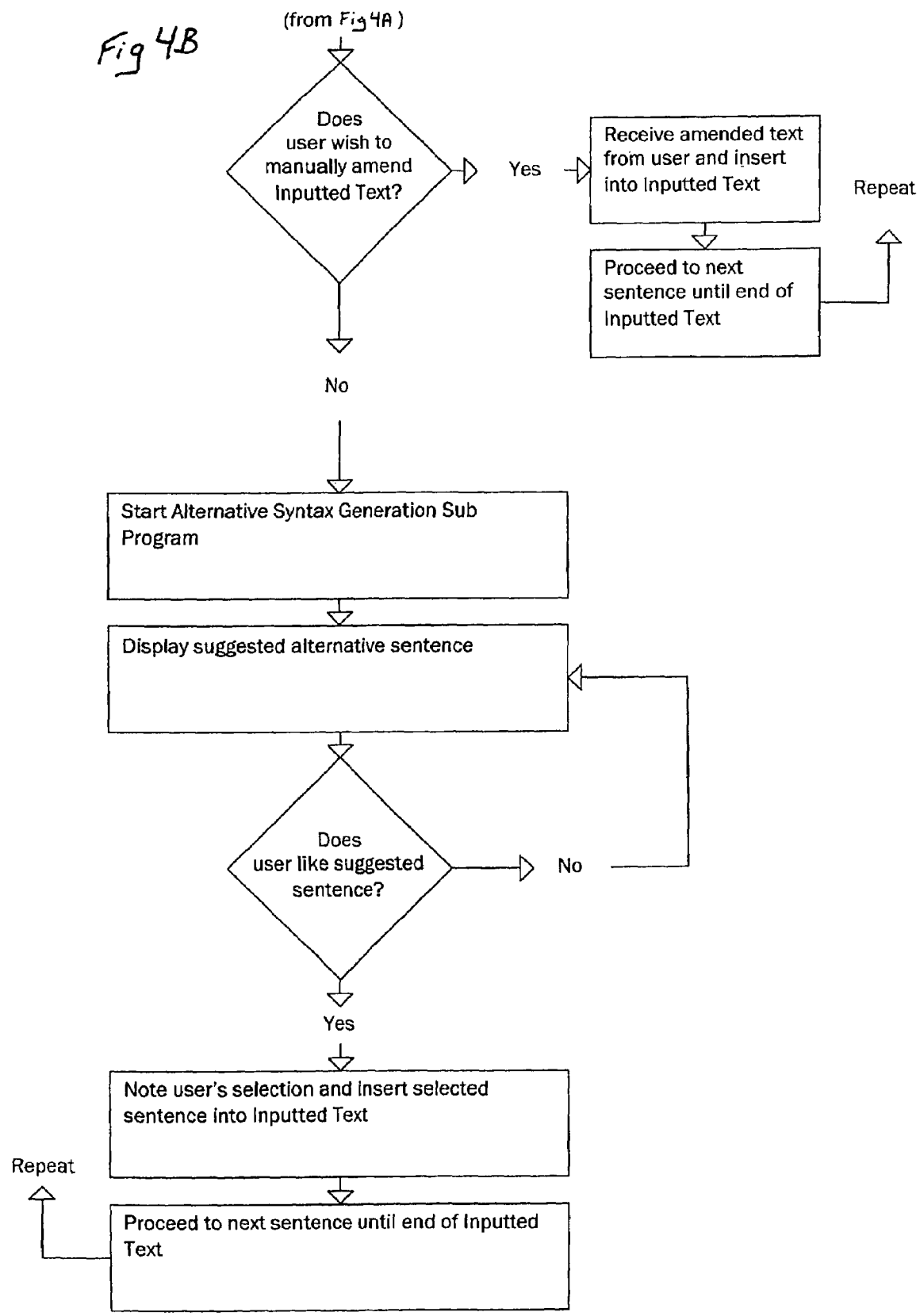

LINGUISTIC ANALYSIS SYSTEM

This invention relates to a linguistic analysis system, preferably, but not exclusively for use with a word processing computer program.

A concept can be expressed in a number of different ways. Alternative words can be used to describe an object or subject, and sentences and paragraphs can be constructed however the author desires.

It is acknowledged that advertising or marketing literature is more effective if the words used are short and readily understood. Further, the words can benefit from alliteration, rhyme and a regular syllabic beat. The skill required to create effective advertising literature requires many years of experience and training.

It has now been found that advertising literature is also more effective if words are arranged in a particular way, irrespective of the words used. A presupposition is just one example of such a syntax arrangement. A presupposition requires particular facts to be given, in order for a sentence to be plausible. For example, if the question is asked: "Have you tried Brand X to clean your carpets?" this presupposes that the person addressed has carpets, and cleans them. Therefore, this sentence will appeal to those who have to clean the carpets in their home, as it appears to empathize with them. If a presupposition was not used here, an alternative phrase could be: "Use Brand X to clean carpets". A similar concept is being expressed, but an opportunity to appeal to the target audience is being missed.

The use of pre-suppositions, and other kinds of syntax arrangements, are known in advertising. However, to date it has not been known to identify specific syntax arrangements, and to employ them irrespective of the diction. Such an approach would not be apparent to a professional advertising writer, who would focus on syntax, grammar, diction, alliteration etc. all at the same time.

Unfortunately, professional advertising writers are expensive to employ. Therefore, many traders prefer to draft their own advertising literature. There has been an explosion of such literature due to the rapid expansion of the internet and other media. However, due to the complexities of language, many traders draft poor advertising or marketing literature, and miss the opportunity to entice potential customers with the right kind of syntax arrangements.

The present invention is intended to provide a novel approach.

Therefore, according to the present invention a computer is provided with a word processing program comprising a syntax evaluation and amendment means adapted to identify predetermined syntax arrangements in inputted text, and to provide alternative syntax arrangements for the inputted text, characterised in that the inputted text is intended to advertise, promote or market goods or services, and the alternative syntax arrangements are adapted to enhance the capability of the inputted text to promote said goods or services.

(The phrase "syntax arrangement" is intended to refer to the grammatical arrangement of the words in a sentence. For example the sentences: "The cat sat on the mat", and "The mat was sat on by the cat", have the same meaning, but the syntax is different.)

Preferably the syntax evaluation and amendment means may be further adapted to identify predetermined characteristics of words or phrases in inputted sentences, and to provide words or phrases with alternative predetermined characteristics. For example, the word "see" is characterised by relating to the visual, while the word "listen" is characterised by relating to the audio. In some circumstances a visual word may be more effective in promoting goods or services than an audio word.

It will be appreciated that a computer program to perform the above described invention on a computer can be readily created using known techniques. In a preferred embodiment syntax evaluation and amendment means comprises a text amendment sub program comprising a text evaluation sub program, a target syntax arrangement and word type database, a dictionary, a thesaurus, an alternative syntax arrangement and word type database, and an alternative text generation sub program.

In a preferred embodiment, the target syntax arrangements and word or phrase types to be identified in the inputted sentences by the text evaluation sub program include the following:

Cause and Effect: a syntax arrangement in which it is implied that one thing causes another unconnected thing. For example, "The cat sat on the mat, so the mat was red".

Comparative Deletion: a syntax arrangement in which an unspecified comparison is made. For example, "The mat was redder".

Complex Equivalent: a syntax arrangement in which two separate things are equated in their meanings as being equivalent. For example, "The cat sat on the mat, because the mat was red."

Conversational Postulate: a question to which the answer is either yes or no. For example, "Did the cat sit on the mat?"

Convincer Presupposition: a syntax arrangement in which a particular individually specific fact or facts must be given in order for the syntax arrangement to be plausible. For example, "Has a cat ever sat on your mat?"

Double Bind: a question to which there are two answers, but both are desired. For example, "Do you want to buy the cat, or the mat?"

Extended Quotes: a series of quotes with an unclear meaning due to being uninterrupted. For example, "The cat sat on the mat," "yes", "and the mat was red," "and the milk was fresh".

Lack of Referential Index: a syntax arrangement which does not make specific reference to the subject. For example: "The cat doesn't know it".

Lost Performative: a syntax arrangement in which a value judgement is made which does not make specific reference to the object. For example: "It is good to sit on the mat".

Mind Read: a syntax arrangement which includes knowledge about an addressed person's thoughts or feelings. For example, "You hate it when the cat sits on the mat".

Modal Operator: a word or phrase type which implies possibility, probability or necessity, or the opposite. For example, "may, could, must" and "may not, could not, must not."

Nominalizations: a verb which is used as a noun. For example, "The cat did the sitting".

Pacing Current Experience: a syntax arrangement in which undeniably describes an addressed person's experience. For example, "You are sitting on the mat".

Phonological Ambiguity: a syntax arrangement in which a synonym creates uncertain meaning. For example, "The cat Sat on the mat."

Presupposition: a syntax arrangement in which a particular general fact or facts must be given in order for the syntax arrangement to be plausible. For example, "Cats sit on mats"

Punctuation Ambiguity: a syntax arrangement in which the punctuation creates uncertain meaning. For example, "The cat sat. On the mat . . . "

Selectional Restriction Violation: a syntax arrangement which combines an inanimate object with an animate adjective. For example, "The mat was happy".

Scope Ambiguity: a syntax arrangement in which a single adjective applied to a number of objects or subjects creates uncertainty. For example, "The good cat and mat."

Syntax Ambiguity: a syntax arrangement in which the function of a word cannot be determined from the immediate context. For example, "The cat sat on the ink well".

Tag Question: a question to which the answer is either yes or no, which comes after a statement. For example, "The cat is sitting on the mat, is it not?"

Universal Quantifier: a syntax arrangement referring to all. For example, "Everyone has a cat".

Unspecified Verbs: a syntax arrangement without a specified verb. For example, "The cat can".

Utilisation: a response which refers to a past or present event in order to motivate. For example, "The cat has not sat on the mat yet".

Visual Word: a word or phrase type which relates to the visual. For example, "look, see, site."

Kinesthetic Word: a word or phrase type which relates to the physical. For example, "feel, touch, thing".

Auditory Word: a word or phrase type which relates to sound. For example, "listen, hear, noise."

Logical word: a word or phrase type which relates to evaluation. For example, "think, consider, thought".

Preferably, the text evaluation sub program may operate as follows. It may be adapted to identify all nouns, adjectives, adverbs, verbs and pronouns in the inputted text by referring to the dictionary. Once this has been achieved, the text evaluation sub program may refer each sentence to the syntax arrangement and word type database to identify any of the above described syntax arrangements or word or phrase types.

Once each sentence has been evaluated, it may be given a score. In a preferred construction, the scores may be derived from the following first formula:

| Syntax arrangement | If first identified arrangement | If second identified arrangement | If further identified arrangement |
|---|---|---|---|
| Convincer presupposition | 7 | 3.5 | 1.75 |
| Complex equivalent | 7 | 3.5 | 1.75 |
| Cause and effect | 7 | 3.5 | 1.75 |
| Nominalizations | 6 | 3 | 1.5 |
| Presuppositions | 6 | 3 | 1.5 |
| Tag questions | 5 | 2.5 | 1.75 |
| Comparative deletions | 4 | 2 | 1 |
| Phonological ambiguities | 4 | 2 | 1 |
| Punctuation ambiguities | 4 | 2 | 1 |
| Scope ambiguities | 4 | 2 | 1 |
| Syntax ambiguities | 4 | 2 | 1 |
| Double binds | 4 | 2 | 1 |

-continued

| Syntax arrangement | If first identified arrangement | If second identified arrangement | If further identified arrangement |
|---|---|---|---|
| Modal operator | 3 | 1.5 | 0.75 |
| Universal quantifier | 2 | 1 | 0.5 |
| Mind reads | 2 | 1 | 0.5 |
| Lost perfoamtives | 2 | 1 | 0.5 |
| Visual word | 1 | 0.5 | 0.25 |
| Kinisthetic word | 1 | 0.5 | 0.25 |
| Auditory word | 1 | 0.5 | 0.25 |
| Logical word | 1 | 0.5 | 0.25 |
| Lack of referential index | 0.2 | 0.1 | 0 |
| Unspecified verbs | 0.2 | 0.1 | 0 |
| Conversational Postulates | 0.2 | 0.1 | 0 |
| Extended Quotes | 0.2 | 0.1 | 0 |
| Pacing Current Experience | 0.2 | 0.1 | 0 |
| Selectional Restriction Violations | 0.2 | 0.1 | 0 |
| Utilisations | 0.2 | 0.1 | 0 |

In one construction the syntax evaluation and amendment means may be further adapted to identify predetermined particular words or phrases in inputted sentences.

In one embodiment the user may be prompted to input two series of particular words or phrases to be identified, before the inputted text is evaluated. The first series of words may be keywords for the product or service being promoted. The second series of words may be actions which the text is intended to illicit. For example, if the text were for a children's charity, the keywords could be, "child, care, support, health", and the actions could be, "donate, money, send". When a keyword or an action is detected, the sentence score can be multiplied by a predetermined factor. In addition, if a synonym for any of the chosen words is detected, by reference to the thesaurus, the sentence score can be multiplied by a smaller predetermined factor. If more than one of the different chosen words or synonyms are present in one sentence, the increase in the sentence score can be compound.

In a preferred construction the score for each sentence derived from the first formula, can then be altered according to the following second formula:

| | Keyword | Action | Synonym |
|---|---|---|---|
| Sentence Score | X2 | X1.4 | X1.2 |

Therefore, if a sentence includes one action word, and a synonym for that action word, the sentence score would be multiplied by 68 percent.

Preferably each sentences may then be placed into one of three categories, according to its score. The sentences may be either red, if they require amendment, amber if amendment should be considered, or green if no amendment is required.

The thresholds for the three categories of score may be determined by the number of sentences in the inputted text, according to the following third formula:

| | Green | Amber | Red |
|---|---|---|---|
| 1-49 sentences | 8 or more | 4-7 | 0-3 |
| 50-99 sentences | 6 or more | 2-5 | 0-1 |
| 100 or more sentences | 5 or more | 1-4 | 0 |

In one construction the sentences may then be displayed in red, amber or green on the computer screen. The user may then select the red or amber sentences, and the alternative text generation sub program can provide alternative sentences, which achieve a score which makes them green, according to the above described formulae.

In order to provide a green alternative sentence, the alternative text generation sub program takes the inputted sentence score, and replaces low scoring syntax arrangements, word or phrase types or particular words or phrases, according to the first or second formula, with higher scoring alternatives according to the first or second formula.

If the user does not wish to use the first suggested alternative sentence, the sub program can produce any number of others. It will be appreciated that the number of alternative sentences which qualify as green would be very large in number. Preferably the score for each alternative sentence can be displayed.

The text evaluation sub program may also be adapted to present a graph which relates to the scores for each sentence. The horizontal axis may list the sentences in order, and the vertical axis can be the score. In a preferred embodiment the user may be able to select points on the graph and "drag" them up from the red or amber section to the green section. When this is done, an alternative sentence is generated as described above, and the user can choose to amend the text accordingly to maintain the desired graph line.

The invention also includes a computer program and/or data which enables a computer to run a word processing program comprising a syntax evaluation and amendment means adapted to identify predetermined syntax arrangements in inputted text, and to provide alternative syntax arrangements for the inputted text, characterised in that the inputted text Is intended to advertise, promote or market goods or services, and the alternative syntax arrangements are adapted to enhance the capability of the inputted text to promote said goods or services.

The invention also includes a medium which holds thereon a program and/or data for enabling a computer to run a word processing program comprising a syntax evaluation and amendment means adapted to identify predetermined syntax arrangements in inputted text, and to provide alternative syntax arrangements for the inputted text, characterised in that the inputted text Is intended to advertise, promote or market goods or services, and the alternative syntax arrangements are adapted to enhance the capability of the inputted text to promote said goods or services, and in which said medium is computer processable.

The invention also includes a method of amending text intended to advertise or market goods or services including the steps:
1) Identifying predetermined syntax arrangements in the text.
2) Providing alternative syntax arrangements adapted to enhance the capability of the text to promote said goods or services.

Preferably the method involves using a computer provided with a word processing program as described above to implement steps 1) and 2).

The invention can be performed in various ways, but one embodiment will now be described by way of example and with reference to the accompanying drawings, in which:

FIG. 3 is a view of an alternative arrangement of the information displayed on the computer screen of the computer as shown in FIG. 1, in use; and, FIG. 4 is a flowchart showing a method according to the present invention.

Figure 1:
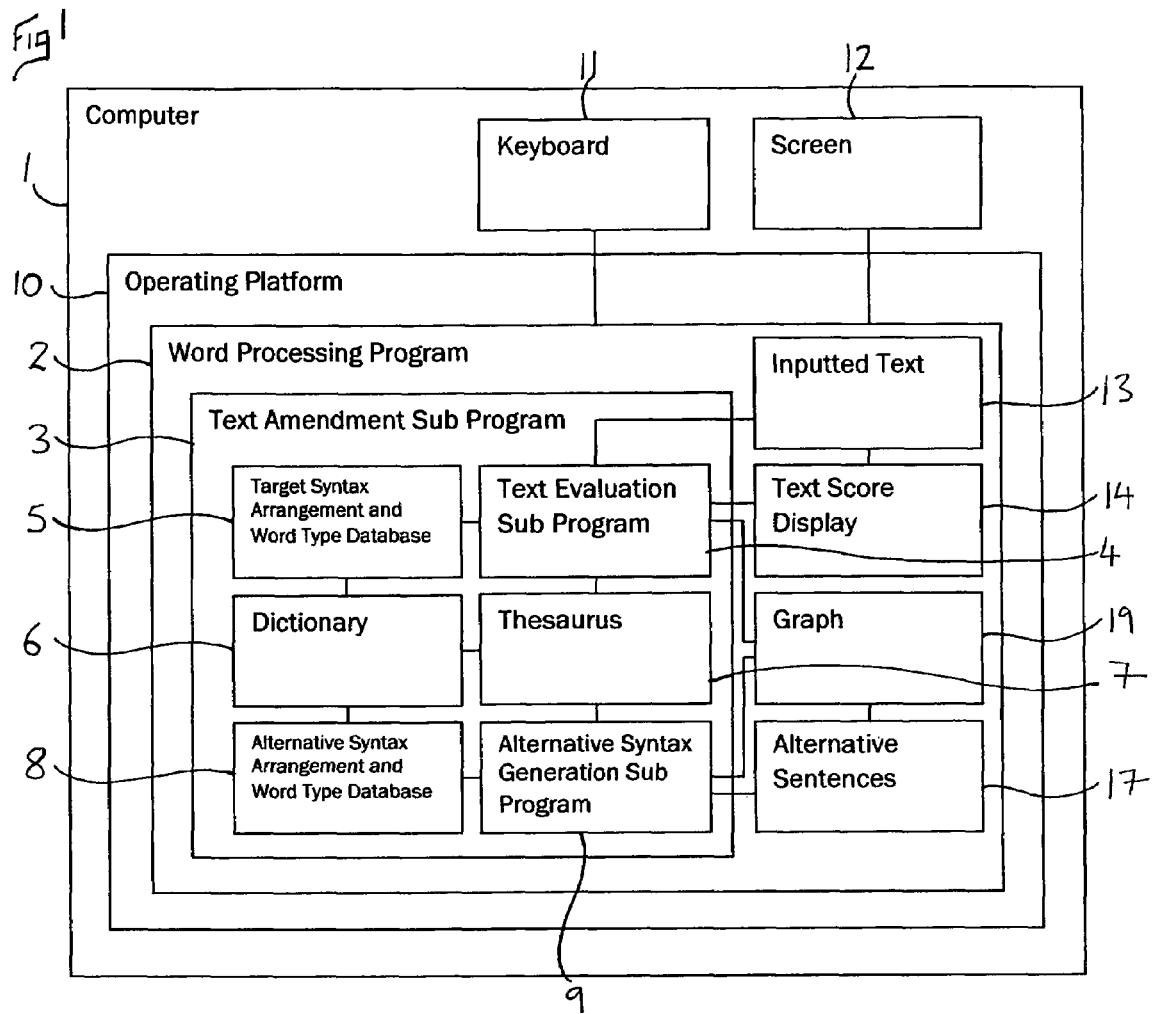
FIG. 1 is a diagrammatic view of the components of a computer according to the present invention.

In FIG. 1 a computer 1 is provided with a word processing program 2 comprising a syntax arrangement evaluation means adapted to identify predetermined syntax arrangements in inputted text, and to provide alternative syntax arrangements for the inputted text, in the form of text amendment sub program 3. The text amendment sub program 3 further comprises a text evaluation sub program 4, a target syntax arrangement and word type database 5, a dictionary 6, a thesaurus 7, an alternative syntax arrangement and word type database 8 and an alternative text generation sub program 9.

The computer is provided with an operating platform 10, upon which the word processing program 2 runs. Further a key board 11, and screen 12 are provided.

In use the word processing program 2 is operated, and the user is presented with a window on the screen 12 which includes two prompts. The first prompt asks for keywords in relation to the product or service to be promoted by the text, and the second prompt asks for words which describe actions which the text is intended to illicit. Once this the user has inputted these words via the key board 11, the user may input their original text. This inputted text 13 is stored in the word processing program 2 and is shown on the screen 12.

When the user has finished, the text amendment sub program 3 may be operated. A series of tasks are then performed as follows:
1) The number of sentences in the inputted text 13 are counted by the text evaluation sub program 4. A sentence is defined as a string or two or more words which ends in a period, question mark or exclamation mark.
2) The nouns, adjectives, adverbs, verbs and pronouns, and their order in each sentence are recognised by the text evaluation sub program 4, by reference to the dictionary 6. Further, the keywords and action words inputted as described above are recognised, as are synonyms for those words. The thesaurus 7 is used to identify the synonyms.
3) Each sentence is then given a score by the text evaluation sub program 4 based on the syntax arrangements and words or phrase types present, according to the following first formula, which is stored in the target syntax arrangement and word type database 5:

| Syntax arrangement | If first identified arrangement | If second identified arrangement | If further identified arrangement |
|---|---|---|---|
| Convincer presupposition | 7 | 3.5 | 1.75 |
| Complex equivalent | 7 | 3.5 | 1.75 |
| Cause and effect | 7 | 3.5 | 1.75 |
| Nominalizations | 6 | 3 | 1.5 |
| Presuppositions | 6 | 3 | 1.5 |
| Tag questions | 5 | 2.5 | 1.75 |
| Comparative deletions | 4 | 2 | 1 |
| Phonological ambiguities | 4 | 2 | 1 |
| Punctuation ambiguities | 4 | 2 | 1 |
| Scope ambiguities | 4 | 2 | 1 |
| Syntax ambiguities | 4 | 2 | 1 |
| Double binds | 4 | 2 | 1 |
| Modal operator | 3 | 1.5 | 0.75 |
| Universal quantifier | 2 | 1 | 0.5 |
| Mind reads | 2 | 1 | 0.5 |
| Lost perfoamtives | 2 | 1 | 0.5 |
| Visual word | 1 | 0.5 | 0.25 |

-continued

| Syntax arrangement | If first identified arrangement | If second identified arrangement | If further identified arrangement |
|---|---|---|---|
| Kinisthetic word | 1 | 0.5 | 0.25 |
| Auditory word | 1 | 0.5 | 0.25 |
| Logical word | 1 | 0.5 | 0.25 |
| Lack of referential index | 0.2 | 0.1 | 0 |
| Unspecified verbs | 0.2 | 0.1 | 0 |
| Conversational Postulates | 0.2 | 0.1 | 0 |
| Extended Quotes | 0.2 | 0.1 | 0 |
| Pacing Current Experience | 0.2 | 0.1 | 0 |
| Selectional Restriction Violations | 0.2 | 0.1 | 0 |
| Utilisations | 0.2 | 0.1 | 0 |

4) The score for each sentence is then altered by the text evaluation sub program 4 if any of the keywords, action words or synonyms for them are present in a sentence, according to the following second formula, which is also stored in the target syntax arrangement and word type database 5:

| | Keyword | Action | Synonym |
|---|---|---|---|
| Sentence Score | X2 | X1.4 | X1.2 |

5) The text evaluation sub program 4 then places each sentence into one of three categories, according to its score. The sentences may be either red, if they require amendment, amber if amendment should be considered, or green if no amendment is required. The thresholds for the three categories of score are determined by the number of sentences in the inputted text, according to the following third formula:

| | Green | Amber | Red |
|---|---|---|---|
| 1-49 sentences | 8 or more | 4-7 | 0-3 |
| 50-99 sentences | 6 or more | 2-5 | 0-1 |
| 100 or more sentences | 5 or more | 1-4 | 0 |

6) Each sentence is then displayed on the screen 12 in red, amber or green, and a text score display 14 is generated, which is shown on the screen 12.

Once the text evaluation sub program 4 has performed these tasks, the user may amend the text however they see fit, by placing the cursor in the text as shown in the screen 12 and amending the text via the keyboard 11. The above described tasks can be operated at any time, so the user may see the results of their amendments.

However, the user may also use the alternative syntax arrangement and word type database 6 and alternative text generation sub program 7 to create alternative green scoring sentences 17 to replace the red or amber ones in the inputted text 13.

Figure 2:
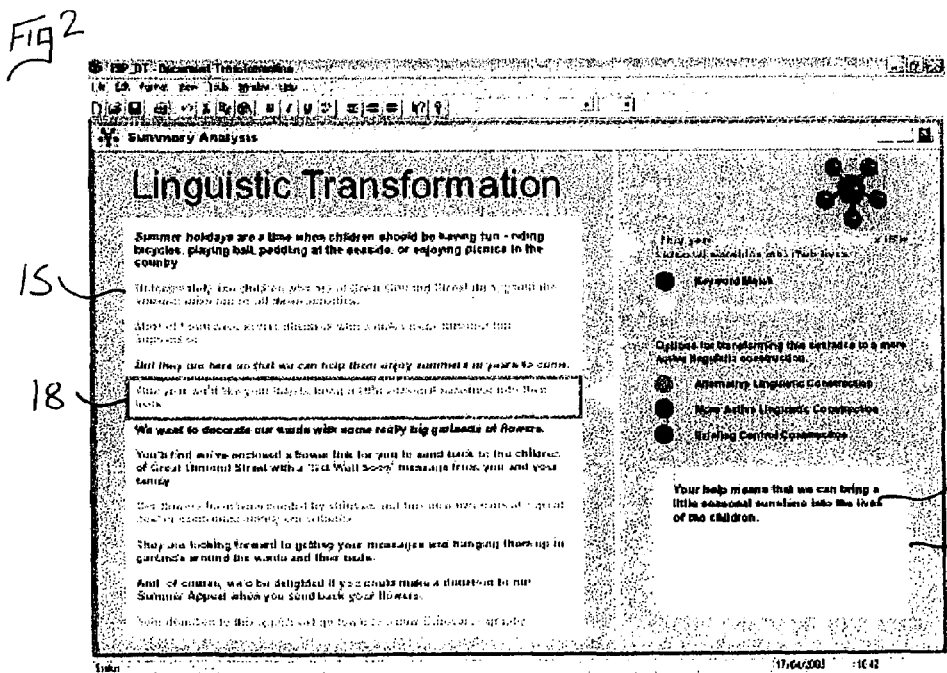
FIG. 2 is a view of the arrangement of the information displayed on the computer screen of the computer as shown in FIG. 1, in use.

The user selects any sentence from the first display box 15 as shown in FIG. 2, and the alternative text generation sub program 7 will create a green scoring sentence 17 using the alternative syntax arrangement and word type database 6, which is shown in the second display box 16. The first and second formulas are used to replace low scoring syntax arrangements or word or phrase types with others which increase the score of the sentence. Further, the sub program 7 may introduce a keyword, an action or a synonym to increase the score.

The user may replace the existing sentence 18 with the suggested alternative 17, by selecting the sentence 17 as shown in the second display box 16. The user may amend the suggested alternative 17 however they would like, before selecting it and introducing it to the text. If the user does not wish to use the first suggested alternative sentence, the alternative text generation sub program 7 can produce any number of others. It will be appreciated that the number of alternative sentences which qualify as green would be very large in number.

In addition, the text evaluation sub program 4 can present a graph 19, which can be shown in the screen 12, and which represents the score for each sentence over the whole body of the inputted text 13, or text at any stage of amendment. An example of such a graph is shown in FIG. 3. The horizontal axis X lists the sentences in chronological order, and the vertical axis Y is the score. The red 20, amber 21 and green 22 banding is also displayed. The user can select a particular indices, for example 23, on the graph line 24, and "drag" that point up into the green section 22, or to any desired score according to the vertical axis Y. The alternative text generation sub program 7 then creates a sentence which matches the desired score, and introduces it into the text, or allows the user to choose whether to introduce it into the text.

A flowchart which displays a sequence of events as described above is shown in FIG. 4.

The above described system is characterised in that the inputted text is intended to advertise, promote or market goods or services, and the suggested changes provided by the text amendment sub program 3 are adapted to enhance the capability of the inputted text to promote said goods or services to a predetermined audience.

Two examples of the way the text amendment sub program 3 operates are as follows.

EXAMPLE 1

£2 a Month Could Help Us Cure Cancer

The sentence scores 8.5 because the first recognised syntax arrangement is Cause and Effect, which scores 7, and the second recognised element is the modal operator "could", which scores 1.5.

This sentence is therefore a green sentence, and does not require amendment.

EXAMPLE 2

You Know We Haven'T Cured Cancer Yet, Don'T You

This sentence scores 1.95 because the first recognised syntax arrangement is the logical word "know", which scores 1, the second element is a Pacing Current Experience construction, which scores 0.2, the third element is the modal operator "haven't" which scores 0.75, the fourth element is a Utilisation, which scores 0, and the fifth element is a Conversational Postulate, which also scores 0.

If the user prompts the alternative text generation sub program 7 to create an alternative sentence, in any of the ways described above, the following sentence may be created:

"Without your money, we won't cure cancer."

This sentence scores 22.5. The first construction used is a Convincer Presupposition—which presupposes that the reader has money to give—which scores 7. The second construction is Cause and Effect, and the third element is the modal operator "won't". As a result of these elements the sentence scores 11.25. However, the word "money" in this case is one of the user's keywords, and therefore the score is doubled to 22.5.

It will be appreciated that the above described scoring and evaluation system can be changed without departing from the spirit of the invention. For example, in one alternative embodiment the user is prompted for information about the intended audience of the literature, and particular types of words can score higher or lower depending on the target audience. For example, if it is determined that women aged between 30 and 40 identify with kinesthetic words, the appearance of these words in text aimed at them gives a higher score.

In addition, in a further alternative embodiment the sentence constructions on either side of a subject sentence can effect its score. For example, the repetition of Convincer Presuppositions could score highly, or the repetition of the same words could lower the score. Further, a high scoring sentence may have its score lowered if one nearby is very low scoring, to encourage consistency in the text.

In further alternative embodiments, the text amendment sub program 3 could be provided with famous advertising text which scores highly, so the user can compare their text with good previous examples. In addition, in one final embodiment the text amendment sub program 3 could be provided at another location to the computer 1, and may be accessed remotely. For example, the text amendment sub program could be provided at a provider's location, and it could be accessed via an internet server.

Thus, a computer, a computer program and a method are provided which can change raw text into highly efficient advertising or marketing literature, based on the syntax constructions employed.

The invention claimed is:

1. A computer provided with a word processing program comprising:
   a syntax evaluation and amendment means adapted to identify predetermined syntax arrangements of groups of words formed into clauses or sentences in inputted text, and to provide alternative clauses or sentences in which the syntax arrangement of the group of words is different, where the inputted text is intended to advertise, promote or market goods or services,
   the alternative syntax arrangements are adapted to enhance the capacity of the inputted text to promote said goods or services,
   the syntax evaluation and amendment means is further adapted to identify predetermined characteristics of words or phrases in inputted sentences, and to provide words or phrases with alternative predetermined characteristics,
   the syntax evaluation and amendment means is adapted to identify the following syntax arrangements in alternative and characteristics of words or phrases: Cause and Effect, Comparative Deletion, Complex Equivalent, Conversational Postulate, Convincer Presupposition, Double Bind, Quotes, Lack of Referential Index, Lost Performative, Mind Read, Modal Operator, Nominalizations, Pacing Current Experience, Phonological Ambiguity, Presupposition, Punctuation Ambiguity, Selectional Restriction Violation, Scope Ambiguity, Syntax Ambiguity, Tag Question, Universal Quantifier, Unspecified Verbs, Utilisation, Visual Word, Kinisthetic Word, Auditory Word, Logical Word, as defined herein, and
   each sentence is given a score according to the following formula:

| Syntax arrangement | If first identified arrangement | If second identified arrangement | If further identified arrangement |
| --- | --- | --- | --- |
| Convincer presupposition | 7 | 3.5 | 1.75 |
| Complex equivalent | 7 | 3.5 | 1.75 |
| Cause and effect | 7 | 3.5 | 1.75 |
| Nominalizations | 6 | 3 | 1.5 |
| Presuppositions | 6 | 3 | 1.5 |
| Tag questions | 5 | 2.5 | 1.75 |
| Comparative deletions | 4 | 2 | 1 |
| Phonological ambiguities | 4 | 2 | 1 |
| Punctuation ambiguities | 4 | 2 | 1 |
| Scope ambiguities | 4 |  | 1 |
| Syntax ambiguities | 4 | 2 | 1 |
| Double binds | 4 | 2 | 1 |
| Modal operator | 3 | 1.5 | 0.75 |
| Universal quantifier | 2 | 1 | 0.5 |
| Mind reads | 2 | 1 | 0.5 |
| Lost performatives | 2 | 1 | 0.5 |
| Visual word | 1 | 0.5 | 0.25 |
| Kinisthetic word | 1 | 0.5 | 0.25 |
| Auditory word | 1 | 0.5 | 0.25 |
| Logical word | 1 | 0.5 | 0.25 |
| Lack of referential index | 0.2 | 0.1 | 0 |
| Unspecified verbs | 0.2 | 0.1 | 0 |
| Conversational Postulates | 0.2 | 0.1 | 0 |
| Extended Quotes | 0.2 | 0.1 | 0 |
| Pacing Current Experience | 0.2 | 0.1 | 0 |
| Selectional Restriction Violations | 0.2 | 0.1 | 0 |
| Utilisations | 0.2 | 0.1 | 0. |

2. The computer as claimed in claim 1 in which the score for a sentence derived form the first formula is effected by the score for the sentences on each side of the sentence.

3. The computer as claimed in claim 1 in which the syntax evaluation and amendment means comprises a text amendment sub program comprising a text evaluation sub program, a target syntax arrangement and word type database, a dictionary, a thesaurus, an alternate syntax arrangement and word type database, and an alternative text generation sub program.

4. The computer as claimed in claim 3 in which the text evaluation sub program is adapted to identify predetermined particular words or phrases in inputted sentences, in which said words or phrases are keywords relating to the characteristics of the goods or services to be promoted, action words relating to the actions the inputted text is intended to illicit, or synonyms for said words, and in which the text evaluation sub program is adapted to alter the score for each sentence according to the following formula:

|  | Green | Amber | Red |
| --- | --- | --- | --- |
| 1-49 sentences | 8 or more | 4-7 | 0.3. |

5. The computer as claimed in claim 4 in which the text evaluation sub program is adapted to categories each sentence in the inputted text as red and requiring amendment, amber and requiring consideration of amendment, or green and requiring no amendment, and in which the thresholds for each category are set according to the following formula:

|                    | Green      | Amber | Red   |
|--------------------|------------|-------|-------|
| 1-49 sentences     | 8 or more  | 4-7   | 0.3   |
| 50-99 sentences    | 6 or more  | 2-5   | 0-1   |
| 100 or more sentences | 5 or more | 1-4  | 0.    |

6. The computer as claimed in claim 5 in which the alternative text generation sub program is adapted to provide alternative sentences provided with syntax arrangements, word or phrase types, or particular words or phrases, which provide the alternative sentence with a green score.

7. The computer as claimed in claim 6 in which the text evaluation sub program is adapted to create a graph to represent the scores for each sentence in the inputted text, in which the horizontal axis of the graph lists the sentences in order, and the vertical axis lists the score.

8. The computer as claimed in claim 7 in which each horizontal point on the graph can be selected and dragged up to another point on the vertical axis, and in which the alternative text generation sub program generates an alternative sentence to replace the sentence which corresponds to the horizontal point, with a score which corresponds to the new vertical point on the graph.

9. A medium which holds thereon a program and/or data for enabling a computer to run a word processing program comprising a syntax evaluation and amendment means adapted to identify predetermined syntax arrangements of groups of words formed into clauses or sentences in inputted text, and to provide alternative clauses or sentences in which the syntax arrangement of the group of words is different, where the inputted text is intended to advertise, promote or market goods or services, and the alternative syntax arrangements are adapted to enhance the capability of the inputted text to promote said goods or services, and in which said medium is computer processable, the syntax evaluation and amendment means is further adapted to identify predetermined characteristics of words or phrases in inputted sentences, and to provide words or phrases with alternative predetermined characteristics, the syntax evaluation and amendment means is adapted to identify the following syntax arrangements in alternative and characteristics of words or phrases: Cause and Effect, Comparative Deletion, Complex Equivalent, Conversational Postulate, Convincer Presupposition, Double Bind, Quotes, Lack of Referential Index, Lost Performative, Mind Read, Modal Operator, Nominalizations, Pacing Current Experience, Phonological Ambiguity, Presupposition, Punctuation Ambiguity, Selectional Restriction Violation, Scope Ambiguity, Syntax Ambiguity, Tag Question, Universal Quantifier, Unspecified Verbs, Utilisation, Visual Word, Kinesthetic Word, Auditory Word, Logical Word, as defined herein, and each sentence is given a score according to the following formula:

| Syntax arrangement | If first identified arrangement | If second identified arrangement | If further identified arrangement |
|---|---|---|---|
| Convincer presupposition | 7 | 3.5 | 1.75 |
| Complex equivalent | 7 | 3.5 | 1.75 |

-continued

| Syntax arrangement | If first identified arrangement | If second identified arrangement | If further identified arrangement |
|---|---|---|---|
| Cause and effect | 7 | 3.5 | 1.75 |
| Nominalizations | 6 | 3 | 1.5 |
| Presuppositions | 6 | 3 | 1.5 |
| Tag questions | 5 | 2.5 | 1.75 |
| Comparative deletions | 4 | 2 | 1 |
| Phonological ambiguities | 4 | 2 | 1 |
| Punctuation ambiguities | 4 | 2 | 1 |
| Scope ambiguities | 4 |  | 1 |
| Syntax ambiguities | 4 | 2 | 1 |
| Double binds | 4 | 2 | 1 |
| Modal operator | 3 | 1.5 | 0.75 |
| Universal quantifier | 2 | 1 | 0.5 |
| Mind reads | 2 | 1 | 0.5 |
| Lost performatives | 2 | 1 | 0.5 |
| Visual word | 1 | 0.5 | 0.25 |
| Kinesthetic word | 1 | 0.5 | 0.25 |
| Auditory word | 1 | 0.5 | 0.25 |
| Logical word | 1 | 0.5 | 0.25 |
| Lack of referential index | 0.2 | 0.1 | 0 |
| Unspecified verbs | 0.2 | 0.1 | 0 |
| Conversational Postulates | 0.2 | 0.1 | 0 |
| Extended Quotes | 0.2 | 0.1 | 0 |
| Pacing Current Experience | 0.2 | 0.1 | 0 |
| Selectional Restriction Violations | 0.2 | 0.1 | 0 |
| Utilisations | 0.2 | 0.1 | 0. |

10. A method of amending text intended to advertise or market goods or services including the steps:
1) identifying predetermined syntax arrangements of groups of words formed into clauses or sentences in the text;
2) providing alternative clauses or sentences, in which the syntax arrangement of the group of words is different, adapted to enhance the capability of the text to promote said goods or services,
3) identifying predetermined characteristics of words or phrases in inputted sentences, and providing words or phrases with alternative predetermined characteristics;
4) identifying the following syntax arrangements in alternative and characteristics of words or phrases: Cause and Effect, Comparative Deletion, Complex Equivalent, Conversational Postulate, Convincer Presupposition, Double Bind, Quotes, Lack of Referential Index, Lost Performative, Mind Read, Modal Operator, Nominalizations, Pacing Current Experience, Phonological Ambiguity, Presupposition, Punctuation Ambiguity, Selectional Restriction Violation, Scope Ambiguity, Syntax Ambiguity, Tag Question, Universal Quantifier, Unspecified Verbs, Utilisation, Visual Word, Kinesthetic Word, Auditory Word, Logical Word, as defined Word, Logical Word, as defined herein; and
5) giving a score according to the following formula:

| Syntax arrangement | If first identified arrangement | If second identified arrangement | If further identified arrangement |
|---|---|---|---|
| Convincer presupposition | 7 | 3.5 | 1.75 |
| Complex equivalent | 7 | 3.5 | 1.75 |
| Cause and effect | 7 | 3.5 | 1.75 |
| Nominalizations | 6 | 3 | 1.5 |
| Presuppositions | 6 | 3 | 1.5 |
| Tag questions | 5 | 2.5 | 1.75 |
| Comparative deletions | 4 | 2 | 1 |

-continued

| Syntax arrangement | If first identified arrangement | If second identified arrangement | If further identified arrangement |
|---|---|---|---|
| Phonological ambiguities | 4 | 2 | 1 |
| Punctuation ambiguities | 4 | 2 | 1 |
| Scope ambiguities | 4 | | 1 |
| Syntax ambiguities | 4 | 2 | 1 |
| Double binds | 4 | 2 | 1 |
| Modal operator | 3 | 1.5 | 0.75 |
| Universal quantifier | 2 | 1 | 0.5 |
| Mind reads | 2 | 1 | 0.5 |
| Lost performatives | 2 | 1 | 0.5 |
| Visual word | 1 | 0.5 | 0.25 |
| Kinisthetic word | 1 | 0.5 | 0.25 |
| Auditory word | 1 | 0.5 | 0.25 |
| Logical word | 1 | 0.5 | 0.25 |
| Lack of referential index | 0.2 | 0.1 | 0 |
| Unspecified verbs | 0.2 | 0.1 | 0 |
| Conversational Postulates | 0.2 | 0.1 | 0 |
| Extended Quotes | 0.2 | 0.1 | 0 |
| Pacing Current Experience | 0.2 | 0.1 | 0 |
| Selectional Restriction Violations | 0.2 | 0.1 | 0 |
| Utilisations | 0.2 | 0.1 | 0. |

11. The method according to claim 10 in which a computer provided with a word processing program according to claim 1 is used to implement steps 1)-4).

* * * * *